(12) United States Patent
Liu et al.

(10) Patent No.: US 10,129,488 B2
(45) Date of Patent: Nov. 13, 2018

(54) METHOD FOR SHOOTING LIGHT-PAINTING VIDEO, MOBILE TERMINAL AND COMPUTER STORAGE MEDIUM

(71) Applicant: NUBIA TECHNOLOGY CO., LTD., Shenzhen, Guangdong (CN)

(72) Inventors: Linwen Liu, Shenzhen (CN); Qiang Li, Shenzhen (CN); Lei Miao, Shenzhen (CN)

(73) Assignee: Nubia Technology Co., Ltd. (CN)

( * ) Notice: Subject to any disclaimer, the term of this patent is extended or adjusted under 35 U.S.C. 154(b) by 0 days.

(21) Appl. No.: 15/327,627

(22) PCT Filed: Jun. 18, 2015

(86) PCT No.: PCT/CN2015/081871
§ 371 (c)(1),
(2) Date: Jan. 19, 2017

(87) PCT Pub. No.: WO2016/011859
PCT Pub. Date: Jan. 28, 2016

(65) Prior Publication Data
US 2017/0208259 A1    Jul. 20, 2017

(30) Foreign Application Priority Data

Jul. 23, 2014 (CN) .......................... 2014 1 0352575

(51) Int. Cl.
*H04N 5/262* (2006.01)
*H04L 29/06* (2006.01)
(Continued)

(52) U.S. Cl.
CPC ......... *H04N 5/2621* (2013.01); *H04L 65/607* (2013.01); *H04N 5/2256* (2013.01);
(Continued)

(58) Field of Classification Search
CPC ............... H04N 5/2621; H04N 5/2257; H04N 5/23222; H04N 5/23232; H04N 5/23245;
(Continued)

(56) References Cited

U.S. PATENT DOCUMENTS

| | | | | |
|---|---|---|---|---|
| 9,813,638 | B2 * | 11/2017 | Warnberg | ............ H04N 5/2621 |
| 2006/0176373 | A1 * | 8/2006 | Ito | ........................ G02B 27/646 |
| | | | | 348/208.12 |

(Continued)

FOREIGN PATENT DOCUMENTS

| | | |
|---|---|---|
| CN | 103595925 A | 2/2014 |
| CN | 103634530 A | 3/2014 |

(Continued)

OTHER PUBLICATIONS

International Search Report issued in International Application No. PCT/CN2015/081871 dated Aug. 20, 2015, with English Translation.

*Primary Examiner* — Kelly L Jerabek
(74) *Attorney, Agent, or Firm* — Eric L. Sophir; Dentons US LLP

(57) ABSTRACT

A method for shooting a light-painting video and a mobile terminal. The method includes steps as follows. After shooting begins, light-painting images are continuously collected by means of a camera. The light-painting images are read at intervals, and a composite image is generated from a current light-painting image and a previously collected light-painting image. Composite images are captured, the captured composite images are video-encoded, and a light-painting video is generated from the video-encoded composite images.

20 Claims, 4 Drawing Sheets

(51) Int. Cl.
*H04N 5/225* (2006.01)
*H04N 5/232* (2006.01)
*H04N 5/235* (2006.01)

(52) U.S. Cl.
CPC ......... *H04N 5/2257* (2013.01); *H04N 5/2354* (2013.01); *H04N 5/23293* (2013.01)

(58) Field of Classification Search
CPC . H04N 5/23248; H04N 5/23293; H04N 5/262
USPC .............................................. 348/218.1, 239
See application file for complete search history.

(56) References Cited

U.S. PATENT DOCUMENTS

2014/0055638 A1  2/2014  Son et al.
2015/0334283 A1* 11/2015  Vranceanu .............. G06T 5/003
                                                            348/239
2017/0171443 A1*  6/2017  Mobbs ................. H04N 5/2329

FOREIGN PATENT DOCUMENTS

| CN | 103888683 A | 6/2014 |
| CN | 104104798 A | 10/2014 |
| WO | 2014/035642 A1 | 3/2014 |

* cited by examiner

METHOD FOR SHOOTING LIGHT-PAINTING VIDEO, MOBILE TERMINAL AND COMPUTER STORAGE MEDIUM

CROSS-REFERENCE TO RELATED APPLICATIONS

This application is national stage of PCT/CN2015/081871, filed Jun. 18, 2015, which claims priority to Chinese Patent Application No. 201410352575.X, filed Jul. 23, 2014, all of which are incorporated by reference in their entirety.

TECHNICAL FIELD

The disclosure relates to the technical field of camera shooting, and in particular to a method for shooting a light-painting video, a mobile terminal and a computer storage medium.

BACKGROUND

As camera shooting hardware of a mobile terminal such as a mobile phone and a tablet computer is continuously improved, a shooting function of the mobile terminal is more and more diversified, and shooting requirements of a user for the mobile terminal are increasingly high. The shooting function of current mobile terminals depends on relevant processing algorithms provided by camera shooting hardware device and chip suppliers, and only several shooting modes such as focusing and white balance are provided. Recently, a shooting mode of light-painting photography emerges, and the user may create art works using light-painting photography. The light-painting photography refers to a shooting mode of performing long-term exposure and creating a special image by means of a change in a light source during an exposure process. Since long-term exposure is required, corresponding photosensitive hardware is needed to support long-term exposure. The photosensitive hardware capable of supporting long-term exposure is relatively expensive, so only a professional camera shooting apparatus such as a single lens reflex (SLR) camera has a light-painting photography function currently.

The current light-painting photography may shoot only a light-painting picture. That is, only a static image displaying the track of the light source is obtained finally. A dynamic video capable of displaying a running process of the light source cannot be shot. Until now, a solution capable of shooting a light-painting video has not yet been developed to meet diversified demands of a user, which affects user experience.

SUMMARY

The disclosure is directed to light-painting video shooting, so as to meet diversified demands of a user and improve the user experience.

To this end, the disclosure provides a method for shooting a light-painting video. The method for shooting a light-painting video may include the following steps:

After shooting begins, light-painting images are continuously collected by means of a camera.

The light-painting images are read at intervals, and a composite image is generated from a current light-painting image and a previously collected light-painting image.

Composite images are captured, the captured composite images are video-encoded, and a light-painting video is generated from the video-encoded composite images.

Preferably, the step that the composite image is generated from the current light-painting image and the previously collected light-painting image may include the steps as follows.

A pixel satisfying a preset condition is selected from the current light-painting image and the previously collected light-painting image respectively, and the pixels at a same position are added, so as to generate a composite image.

Preferably, the step that the pixels satisfying the preset condition are selected may include the steps as follows.

It is judged whether a luminance parameter value of the pixel is greater than a preset threshold, if yes, it is determined that the pixel satisfies the preset condition, and the pixel is selected.

Preferably, the step that the pixel satisfying the preset condition is selected may include the steps as follows.

It is judged whether the pixel is a suddenly changed pixel.

If the pixel is the suddenly changed pixel, an average of luminance parameter values of a preset number of pixels around the suddenly changed pixel is calculated. It is judged whether the average is greater than the preset threshold, if yes, it is determined that the suddenly changed pixel satisfies the preset condition, and the suddenly changed pixel is selected.

If the pixel is not the suddenly changed pixel, it is further judged whether the luminance parameter value of the pixel is greater than the preset threshold, if yes, it is determined that the pixel satisfies the preset condition, and the pixel is selected.

Preferably, before the captured composite images are video-encoded, the method for shooting a light-painting video may further include the steps as follows.

Special effect processing is performed on the captured composite images.

In addition, to this end, the disclosure also provides a mobile terminal. The mobile terminal may include a collection module, an image generation module and a video generation module.

The collection module is configured to continuously collect, after shooting begins, light-painting images by means of a camera;

The image generation module is configured to read the light-painting images at intervals, and generate a composite image from a current light-painting image and a previously collected light-painting image.

The video generation module is configured to capture composite images, video-encode the captured composite images, and generate a light-painting video from the video-encoded composite images.

Preferably, the image generation module may be configured to select a pixel satisfying a preset condition from the current light-painting image and the previously collected light-painting image, and add pixels at the same position, so as to generate a composite image.

Preferably, the image generation module may be further configured to judge whether a luminance parameter value of the pixel is greater than a preset threshold, if yes, determine that the pixel satisfies the preset condition, and select the pixel.

Preferably, the image generation module may be further configured to judge whether the pixel is a suddenly changed pixel; if the pixel is the suddenly changed pixel, calculate an average of luminance parameter value s of a preset number of pixels around the suddenly changed pixel, judge whether the average is greater than the preset threshold, if yes, determine that the suddenly changed pixel satisfies the preset condition, and select the suddenly changed pixel; and if the pixel is not the suddenly changed pixel, further judge whether the luminance parameter value of the pixel is greater than the preset threshold, if yes, determine that the pixel satisfies the preset condition, and select the pixel.

Preferably, the mobile terminal may further include a processing module, configured to perform special effect processing one the captured composite images.

Further, to this end, the disclosure also provides a computer storage medium. A computer executable instruction may be stored in the computer storage medium. The computer executable instruction may be configured to execute the above processing.

According to the disclosure, after shooting begins, light-painting images are continuously collected by means of a camera, the light-painting images are read at an interval, and a composite image is generated from a current light-painting image and a previously collected light-painting image. Composite images are captured, the captured composite images are video-encoded, and a light-painting video is generated from the video-encoded composite images, thereby achieving shooting of a light-painting video. Thus, the disclosure may allow a user to shoot a video displaying a running process of a light source using a shooting apparatus, and may be applied to similar application scenarios, meeting diversified demands of the user and improving the user experience. Meanwhile, since shooting and composite image encoding are performed in parallel, a generated composite image does not have to be stored. Therefore, a resultant video file obtained by shooting will not be very large, and thus will not occupy too much storage space.

The aim fulfilment, functional features and advantages of the disclosure will be further illustrated with reference to the drawings and in conjunction with embodiments.

DETAILED DESCRIPTION

It will be understood that specific embodiments described herein are only intended to explain the disclosure and are not intended to limit the disclosure.

An embodiment of the disclosure provides a method for shooting a light-painting video.

Figure 1:
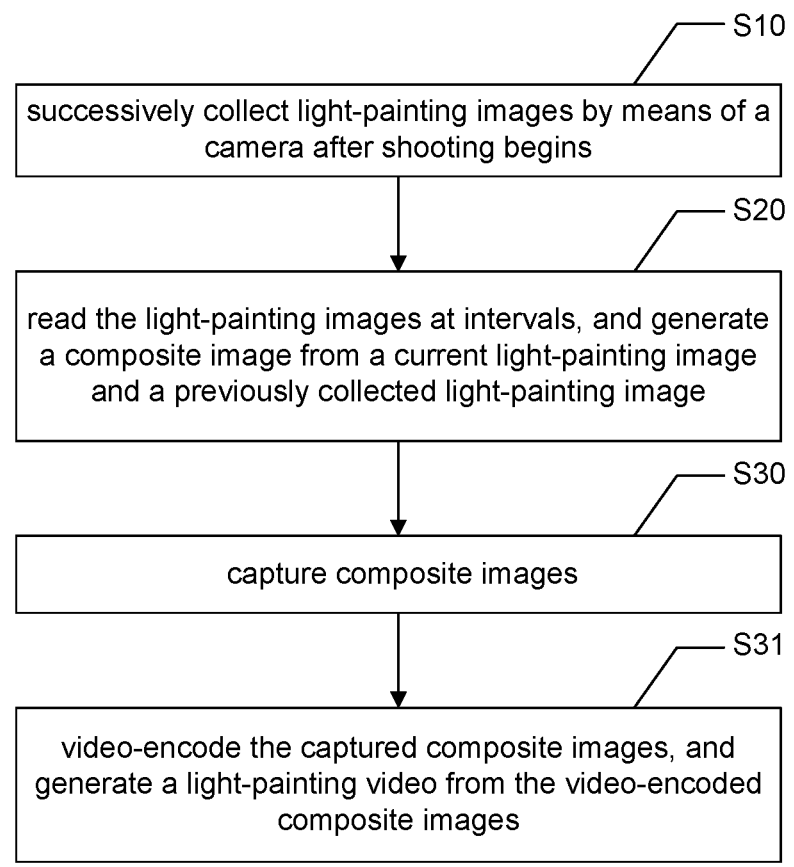
FIG. 1 is a flowchart of a first method for shooting a light-painting video according to an embodiment of the disclosure.

FIG. 1 is a flowchart of a first embodiment of a method for shooting a light-painting video according to the disclosure.

In one embodiment, the method for shooting a light-painting video includes the following steps.

Step S10: After shooting begins, light-painting images are continuously collected by means of a camera.

A light-painting photography mode is added to a shooting function of a mobile terminal in the disclosure. A user may select the light-painting photography mode or a common photography mode for shooting. The light-painting photography mode adjusts and limits parameters such as ISO, picture quality and scenario modes in advance in conjunction with requirements of a light-painting photography scenario, and outputs the parameters to a relevant hardware device, such that the relevant hardware device samples or processes collected image data.

When the user selects the light-painting photography mode, after a shooting key is pressed down or a virtual shooting key is triggered, the mobile terminal begins to perform light-painting photography, and continuously collects the light-painting images by using the camera, and the speed at which the light-painting images are continuously collected by the camera may be preset. In order to guarantee continuity of light-painting, the camera has to continuously collect at least ten images within 1 second, subsequent image composition cannot follow image collection, and therefore the light-painting images may be preferably cached in a caching module (certainly, if the processing speed of the mobile terminal is high enough, caching may not be needed). Furthermore, during collecting the light-painting images, the mobile terminal may adjust the collection speed in real time according to the remaining space of the caching module, such that the processing capability of the mobile terminal can be utilized to the greatest extent, and data loss caused by data overflow due to over-high collection speed can be prevented.

Step S20: The light-painting images are read at intervals, and a composite image is generated from a current light-painting image and a previously collected light-painting image.

In the mobile terminal, an image composition module, configured to process the light-painting images to generate the composite image, may directly receive and read the collected light-painting images at intervals; or, the light-painting images may be read in real time at intervals from the caching module and composited, and then the caching module is reset and cleared to provide space for subsequent data. The speed or interval at which the light-painting images are read by the image composition module may be preset, or depend on the calculation speed of the mobile terminal. The image composition module superposes pixels in the current light-painting image and the previously collected light-painting image to generate a composite image. Since the camera continuously collects the light-painting images, composite images are continuously generated in real time. In a shooting process, when a first light-painting image is collected, the first light-painting image serves as an image to be composited. After a second light-painting image is collected, the second light-painting image and the image to be composited are composited into a current composite image, a subsequently collected light-painting image and a previously generated composite image are composited sequentially, and a composite image formed by all of the shot light-painting images is generated finally.

The interval may be a period for operation, wherein the length of the period may be set as required.

Preferably, the image composition module selects a pixel satisfying a preset condition from the current light-painting image and the previously collected light-painting image, and then adds the pixels.

Specifically, according to one embodiment, when judging whether a pixel satisfies the preset condition, the image composition module may directly judge whether a luminance parameter of the pixel is greater than a preset threshold, and if yes, it is determined that the pixel satisfies the preset condition. After selecting the pixel satisfying the preset condition from the current light-painting image and the previously collected light-painting image respectively (that is, an absolute value of the luminance of a point on an image is greater than a threshold), the image composition module only adds these pixels satisfying the preset condition, such that pixels having lower luminance are filtered to a certain extent, and a picture of a final composite image is prevented from being polluted by an accumulation effect of ambient light. The threshold may be determined according to the average luminance of the image. The luminance parameter is an optical parameter such as an RGB value and a YUV value.

For example, each light-painting image may include n pixel units namely a pixel unit 1, a pixel unit 2 to a pixel unit n, wherein pixel parameter values of the pixel unit 101 to the pixel unit 200 in a current light-painting image are greater than the threshold, and pixel parameter values of the pixel unit 1 to the pixel unit 100 in a previous light-painting image are greater than the threshold, so current and previous pixel parameter values of the pixel unit 1 to the pixel unit 200 are added. Assuming that the luminance parameter values of the pixel unit 1 in the current light-painting image and the previous light-painting image are 10 and 100 respectively, the luminance parameter value of the pixel unit 1 in a composite image after addition will be 100+10=110. In addition, the image composition module further performs noise reduction on the composite image, and controls a composition proportion of a new composite image based on the exposure of the conventional image, thereby supressing over-exposure.

According to another embodiment, the pixel satisfying the preset condition may further be selected by means of the following steps:

It is judged whether the pixel is a suddenly changed pixel.

If the pixel is the suddenly changed pixel, an average value of luminance parameters of a preset number of pixels around the suddenly changed pixel is calculated. It is judged whether the average value is greater than a preset threshold, and if yes, it is determined that the suddenly changed pixel satisfies the preset condition, and the suddenly changed pixel is selected.

If the pixel is not the suddenly changed pixel, it is further judged whether the luminance parameter of the pixel is greater than the preset threshold, and if yes, it is determined that the pixel satisfies the preset condition, and the pixel is selected.

The image composition module compares a luminance parameter of a pixel with an average of luminance parameters of a plurality of pixels (eight pixels, preferably) around the pixel. If the luminance parameter is higher than or lower than a preset multiple of the average, it is determined that the pixel is a suddenly changed pixel. The preset multiple may be more than 2 or lower than 0.5.

If the pixel is the suddenly changed pixel, the average of the luminance parameters of the pixels therearound is adopted, where there are preferably several pixels around the pixel, and the preset number is preferably 8. After the average of the luminance parameter values of the preset number of pixels around the suddenly changed pixel is calculated, it is judged whether the average is greater than the preset threshold. If the average is greater than the preset threshold, it is determined that the suddenly changed pixel satisfies the preset condition, the pixel is selected, and an addition operation is performed subsequently to generate a composite image, thereby eliminating a noise point in the image, and avoiding influence on a picture effect of the final composite image. If the average is smaller than or equal to the preset threshold, it is determined that the suddenly changed pixel does not satisfy the preset condition, and the pixel is not selected.

If the pixel is not the suddenly changed pixel, the luminance parameter of the pixel is directly compared with the preset threshold. If the luminance parameter is greater than the preset threshold, it is determined that the pixel satisfies the preset condition, the pixel is selected, and an addition operation is performed subsequently to generate a composite image. If the luminance parameter is smaller than or equal to the preset threshold, it is determined that the pixel does not satisfy the preset condition, and the pixel is not selected.

Since only areas having higher luminance in the images are superposed while other areas are not superposed during image composition, bright areas are constantly bright, dark areas are constantly dark, and the light-painting effect of the composite images is improved.

Although all of the composite images are continuously generated, a time interval exists between adjacent generated images actually under the restriction of the processing speed of the image composition module. The higher the calculation speed is, the shorter the time interval is. The image generation speed affects the collection speed of image data in turn, that is, the higher the image generation speed is, the higher the reading speed of image data in the caching module is, and thus the higher the space emptying speed of the caching module is, so the higher the speed of collecting light-painting image data by the mobile terminal is.

The mobile terminal displays the composite images on a display screen in real time, so as to allow the user to preview a current light-painting effect in real time. In order to achieve a fluent preview effect, the composite images displayed by the mobile terminal are compressed thumbnails, while full-sized images are stored. That is, display and storage are two separate threads. When the user presses down a shooting key again or presses down an ending key, shooting is ended. The mobile terminal may store each composite image locally, and may store only a composite image finally generated when shooting is ended.

Step S30: Composite images are captured.

Step S31: The captured composite images are video-encoded, and a light-painting video is generated from the video-encoded composite images.

After composite images corresponding to light-painting images are generated, the composite images may be captured continuously or captured at intervals, and the composite images are video-encoded so as to generate a light-painting video. Continuously capturing the composite images means that each composite image, once being generated, is captured immediately for video-encoding. That is, all of the generated composite images are taken as materials for video composition. Generation of a composite image and capturing of a composite image for video-encoding are two threads which are performed in parallel. Since shooting and video-encoding of a composite image are performed in parallel, the generated composite images do not have to be stored.

Interval capturing means selectively capturing some of the composite images as materials for video composition. An interval manner may be a manual interval mode or an automatic interval mode. In the manual interval mode, an operation interface is provided such that the user clicks to trigger capturing of image data, and for example, the user clicks on a screen to capture a currently generated composite image (i.e., a current preview image in case of preview); and in the automatic interval mode, composite images are captured at preset time intervals, that is, capturing a composite image at an interval of preset time. The time interval for capturing a composite image is preferably longer than the time interval (i.e., the exposure time) for collecting an image by the camera, thereby avoiding capturing of a same composite image for two or more times, or reducing the size of a finally composited video file. For example, a composite image may be captured at an interval of 1-2 minutes, the composite image being a currently generated composite image, i.e., a light-painting picture at current time. Then, the captured composite images are video-encoded in a common format such as Moving Picture Experts Group (MPEG)-4, H264, H263 and VP8 etc., for subsequent generation of a video file. The details of a method for video-encoding the composite images belong to a prior art, which will be omitted here.

In addition, capturing a composite image at a preset time interval may be expressed as capturing a composite image every time the camera collects a preset number of images. For example, assuming that the camera collects an image at an interval of 10 seconds (that is, exposure time is 10 seconds), the shooting apparatus captures a composite image every time the camera collects three images. Equivalently, a composite image is captured at an interval of 3*10 seconds=30 seconds.

The captured composite images are video-encoded, and after shooting is ended, a video file is generated from the video-encoded composite images. A format of the generated video file may be appointed by the user. The format of the video file includes, but is not limited to, mp4, 3gp, avi, rmvb and the like.

According to this embodiment, after shooting begins, light-painting images are continuously collected using a camera, the light-painting images are read at intervals, and a composite image is generated from a current light-painting image and a previously collected light-painting image. Composite images are captured, the captured composite images are video-encoded, and a light-painting video is generated from the video-encoded composite images, thereby achieving shooting of a light-painting video. Thus, this embodiment may allow a user to shoot a video displaying a running process of a light source using a shooting apparatus, or this embodiment may be applied to similar application scenarios, meeting diversified demands of the user and improving the user experience. Meanwhile, since shooting and composite image encoding are performed in parallel, a generated composite image does not need to be stored. Therefore, the resultant video file obtained by shooting will not be very large and thus will not occupy too much storage space.

Figure 2:
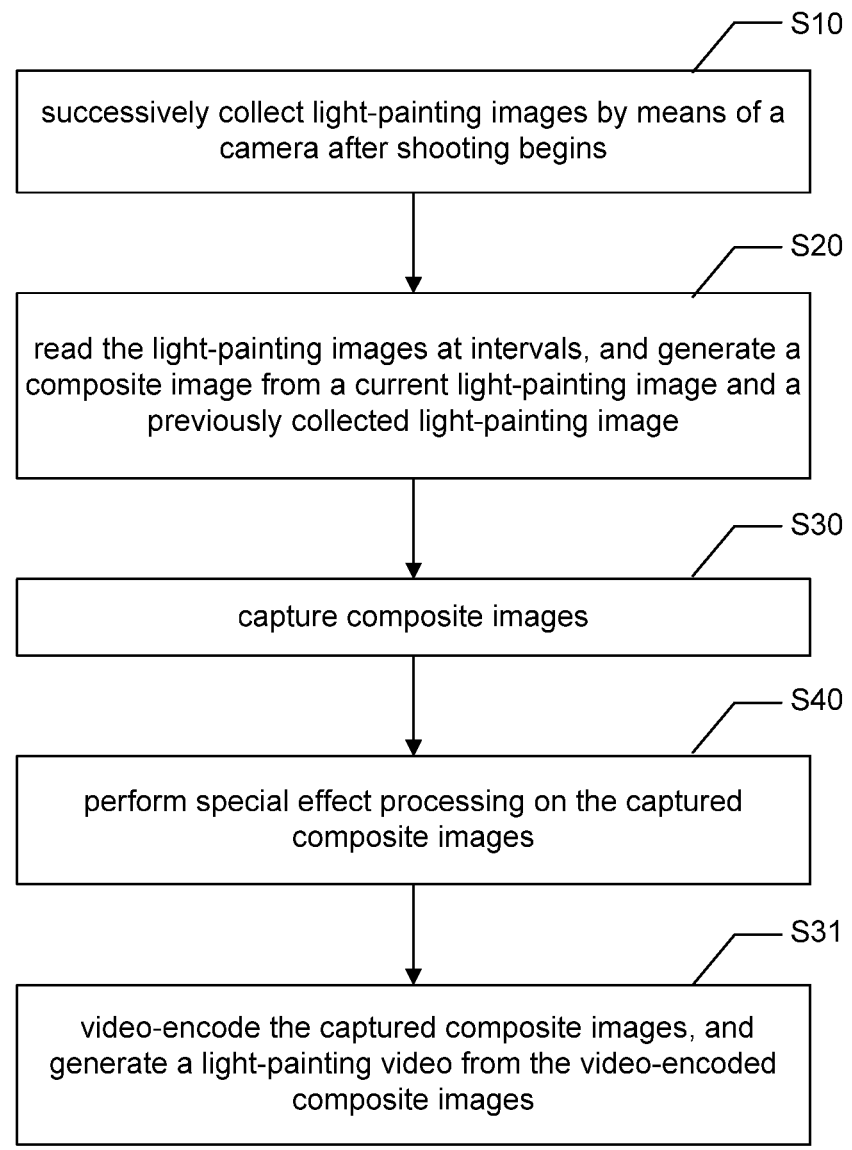
FIG. 2 is a flowchart of a second method for shooting a light-painting video according to an embodiment of the disclosure.

FIG. 2 is a flowchart of a second method for shooting a light-painting video according to an embodiment of the disclosure.

Based on the first the method for shooting a light-painting video according to an embodiment of the disclosure, before Step S31 is executed, the method may further include the following step.

Step S40: Special effect processing is performed on the captured composite images.

Furthermore, in order to make the user more interested in shooting, before the captured composite images are encoded, special effect processing may be performed on the captured composite images. The special effect processing includes basic effect processing, filter effect processing and/or special scenario effect processing, wherein the basic effect processing includes noise reduction processing, luminance processing, chrominance processing and the like; the filter effect processing may include drawing processing, negative processing, black-white processing and the like; and the special scenario effect processing may include common weather processing, starry sky processing and the like.

Furthermore, in order to enable the user to perform sound recording when the video is being recorded, in parallel to capturing and encoding the composite images, the method may further include: turning on an audio device to receive audio data; and encoding the audio data. The audio data may be collected by a microphone or may be from a custom audio file. When the audio data is from the custom audio file, the audio file is decoded firstly to obtain original audio data. Preferably, the audio data may be further subject to special effect processing before being encoded, the special effect processing including at least one of special effect recording, sound change, tone change and speed change.

In case of adding an audio recording function, a video file may be generated as follows. In accordance with a shooting ending instruction of the user, the video file in a format set by the user is generated from encoded image data and encoded audio data.

To facilitate the operation of the user, an operation interface may be provided for the user to set a mode (interval capturing or continuous capturing) of capturing the composite images, interval time for interval capturing, whether to perform the special effect processing, and whether to enable an audio recording function.

The disclosure also provides a mobile terminal.

Figure 3:
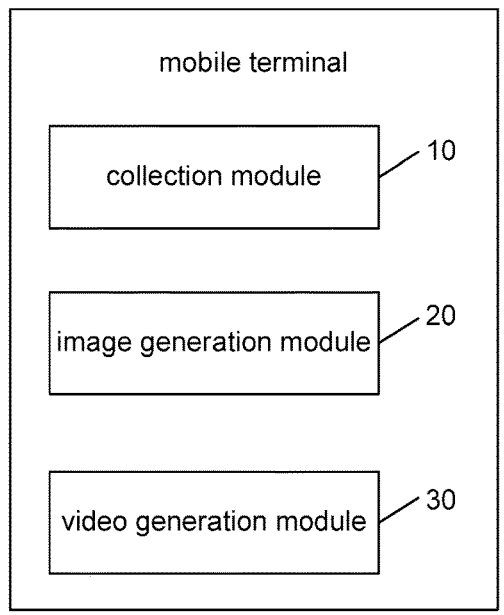
FIG. 3 is a functional module diagram of a first mobile terminal according to an embodiment of the disclosure.

FIG. 3 is a functional module diagram of a first mobile terminal according to an embodiment of the disclosure.

In one embodiment, the mobile terminal may include:

a collection module 10, configured to continuously collect light-painting images by means of a camera, after shooting begins;

an image generation module 20, configured to read the light-painting images at intervals, and generate a composite image from a current light-painting image and a previously collected light-painting image; and a video generation module 30, configured to capture composite images, video-encode the captured composite images, and generate a light-painting video from the video-encoded composite images.

A light-painting photography mode is added to a shooting function of a mobile terminal in the disclosure. A user may select the light-painting photography mode or a common photography mode for shooting. In the light-painting photography mode, parameters such as ISO, picture quality and scenario modes are adjusted and limited in advance in conjunction with requirements of a light-painting photography scenario, and then are output to a relevant hardware device, such that the relevant hardware device samples or processes collected image data.

When the user selects the light-painting photography mode, after a shooting key is pressed down or a virtual shooting key is triggered, the mobile terminal begins to perform light-painting photography, the collection module 10 continuously collects the light-painting images by using the camera, and the speed of continuously collecting the light-painting images by the camera may be preset. In order to guarantee continuity of light-painting, the camera has to continuously collect at least ten images within 1 seconds, subsequent image composition cannot follow image collection, and therefore the light-painting images are preferably cached in a caching module (certainly, if the processing speed of the mobile terminal is high enough, caching may not be needed). Furthermore, during collecting the light-painting images, the mobile terminal may adjust the collection speed in real time according to the remaining space of the caching module, such that the processing capability of the mobile terminal can be utilized to the greatest extent, and data loss caused by data overflow due to over-high collection speed can be prevented.

Through an image composition module configured to process the light-painting images to generate a composite image in the mobile terminal, the image generation module 20, directly receives and reads the collected light-painting images at intervals; or, reads the light-painting images in real time at intervals from the caching module and composite the light-painting images, and reset the caching module to empty data therein so as to provide space for subsequent data. The speed or time interval at which the light-painting images are read by the image composition module may be preset, or may depend on the calculation speed of the mobile terminal. The image composition module superposes pixels in the current light-painting image and the previously collected light-painting image to generate a composite image. Since the camera continuously collects the light-painting images, composite images are continuously generated in real time. In a shooting process, when a first light-painting image is collected, the first light-painting image serves as an image to be composited. After a second light-painting image is collected, the second light-painting image and the image to be composited are composited into a current composite image, a subsequently collected light-painting image and a previously generated composite image are composited sequentially, and a composite image formed by all of the shot light-painting images is generated finally.

Preferably, the image composition module selects pixels satisfying a preset condition from the current light-painting image and the previously collected light-painting image, and then adds the pixels.

According to one embodiment, when judging whether a pixel satisfies the preset condition, the image composition module may directly judge whether a luminance parameter value of the pixel is greater than a preset threshold, and if yes, it is determined that the pixel satisfies the preset condition. After selecting the pixels satisfying the preset condition from the current light-painting image and the previously collected light-painting image (that is, an absolute value of the luminance of a point on an image is greater than a threshold), the image composition module only adds these pixels satisfying the preset condition, such that pixels having lower luminance are filtered to a certain extent, and a picture of a final composite image is prevented from being polluted by an accumulation effect of ambient light. The size of the threshold may be determined according to the average luminance of the image. The luminance parameter is an optical parameter such as an RGB value and a YUV value.

For example, each light-painting image may include n pixel units namely a pixel unit 1, a pixel unit 2 to a pixel unit n, wherein pixel parameter values of the pixel unit 101 to the pixel unit 200 in a current light-painting image are greater than the threshold, and pixel parameter values of the pixel unit 1 to the pixel unit 100 in a previous light-painting image are greater than the threshold, so current parameter values and previous pixel parameter values of the pixel unit 1 to the pixel unit 200 are added. Assuming that the luminance parameter values of the pixel unit 1 in the current light-painting image and the previous light-painting image are respectively 10 and 100, the luminance parameter value of the pixel unit 1 in a composite image after addition will be 100+10=110. In addition, the image composition module may further perform noise reduction on the composite image, and control a composition proportion of a new composite image according to the exposure of the conventional image, thereby suppressing over-exposure.

According to another embodiment, pixels satisfying the preset condition may further be selected by the following steps.

It is judged whether the pixel is a suddenly changed pixel.

If the pixel is the suddenly changed pixel, an average of luminance parameter values of a preset number of pixels around the suddenly changed pixel is calculated. It is judged whether the average is greater than a preset threshold, if yes, it is determined that the suddenly changed pixel satisfies the preset condition, and the suddenly changed pixel is selected.

If the pixel is not the suddenly changed pixel, it is further judged whether the luminance parameter value of the pixel is greater than the preset threshold, and if yes, it is determined that the pixel satisfies the preset condition, and the pixel is selected.

The image composition module compares a luminance parameter value of a pixel with an average of luminance parameter values of a plurality of pixels (eight pixels, preferably) around the pixel. If the luminance parameter is higher than or lower than a preset multiple of the average, it is determined that the pixel is a suddenly changed pixel. The preset multiple is higher than 2 or lower than 0.5.

If the pixel is the suddenly changed pixel, the average of the luminance parameter values of the pixels therearound is adopted. There are preferably several pixels around the pixel, and the preset number is preferably 8. After the average of the luminance parameter values of the preset number of pixels around the suddenly changed pixel is calculated, it is judged whether the average is greater than the preset threshold. If the average is greater than the preset threshold, it is determined that the suddenly changed pixel satisfies the preset condition, the pixel is selected, and addition is executed subsequently to generate a composite image, thereby eliminating a noise point in the image, and avoiding influence on a picture effect of the final composite image. If the average is smaller than or equal to the preset threshold, it is determined that the suddenly changed pixel does not satisfy the preset condition, and the pixel is not selected.

If the pixel is not the suddenly changed pixel, the luminance parameter of the pixel is directly compared with the preset threshold. If the luminance parameter is greater than the preset threshold, it is determined that the pixel satisfies the preset condition, the pixel is selected, and an addition operation is performed subsequently to generate a composite image. If the luminance parameter is smaller than or equal to the preset threshold, it is determined that the pixel does not satisfy the preset condition, and the pixel is not selected.

Since only areas having higher luminance in the images are superposed while other areas are not superposed during image composition, bright areas are constantly bright, dark areas are constantly dark, and the light-painting effect of the composite images is improved.

Although all of the composite images are continuously generated, a certain time interval exists between adjacent generated images actually under the restriction of the processing speed of the image composition module. The higher the calculation speed is, the shorter the time interval is. The image generation speed affects the collection speed of image data in turn, that is, the higher the image generation speed is, the higher the reading speed of image data in the caching module is, and thus the higher the space emptying speed of the caching module is, so the higher the speed of collecting light-painting image data by the mobile terminal is.

The mobile terminal displays the composite images on a display screen in real time, so as to allow the user to preview a current light-painting effect in real time. In order to achieve a fluent preview effect, the composite images displayed by the mobile terminal are compressed thumbnails, and full-sized images are stored. That is, display and storage are two separate threads. When the user presses down a shooting key again or presses down an ending key, shooting is ended. The mobile terminal may store each composite image locally, or may store only a composite image finally generated when shooting is ended.

After composite images corresponding to light-painting images are generated, the video generation module 30 may capture composite images continuously or at intervals, and video-encode the composite images so as to generate a light-painting video. Continuously capturing the composite images means capturing each composite image, once being generated, is captured immediately for video-encoding. That is, all of the generated composite images are taken as materials for video composition. Generation of a composite image and capturing of a composite image for video-encoding are two threads performed in parallel. Since shooting and video-encoding of a composite image are performed in parallel, the generated composite images do not have to be stored.

Interval capturing means selectively capturing some composite images as materials for video composition. An interval manner may be a manual interval mode or an automatic interval mode. The manual interval mode refers to providing an operation interface on which the user clicks to trigger capturing of image data, and for example, the user clicks on a screen to capture a currently generated composite image (namely, a current preview image in case of preview); and the automatic interval mode refers to capturing composite images at preset time intervals, that is, capturing a composite image at an interval of preset time. Interval time for capturing a composite image is preferably longer than interval time (namely, the exposure time) for collecting an image by the camera, thereby avoiding capturing of the same composite image for two or more times, or reducing the size of a resultant video file. For example, a composite image may be captured at an interval of 1-2 minutes, the composite image is a currently generated composite image, i.e., a current light-painting picture. Then, the captured composite images are video-encoded in a common format such as MPEG-4, H264, H263 and VP8, for subsequent generation of a video file. The details of a method for video-encoding the composite images belong to a prior art, which will be omitted here.

In addition, capturing composite images at a preset time interval may be expressed as capturing a composite image every time the camera collects a preset number of images. For example, assuming that the camera collects an image at an interval of 10 seconds (that is, exposure time is 10 seconds), the shooting apparatus captures a composite image every time the camera collects three images. Equivalently, a composite image is captured at an interval of 3*10 seconds=30 seconds.

The captured composite images are video-encoded, and after shooting is ended, a video file is generated from the video-encoded composite images. A format of the generated video file may be appointed by the user. The format of the video file may include, but is not limited to, mp4, 3gp, avi, rmvb and the like.

According to this embodiment, after shooting begins, light-painting images are continuously collected by using a camera, the light-painting images are read at intervals, and a composite image is generated from a current light-painting image and a previously collected light-painting image. Composite images are captured, the captured composite images are video-encoded, and a light-painting video is generated from the video-encoded composite images, thereby achieving shooting of a light-painting video. Thus, this embodiment may allow a user to shoot a video displaying a running process of a light source by using a shooting apparatus, and may be applied to similar application scenarios, meeting diversified demands of the user and improving the user experience. Meanwhile, since shooting and composite image encoding are performed in parallel, a generated composite image does not have to be stored. Therefore, the resultant video file will not be very large and thus will not occupy too much storage space.

Figure 4:
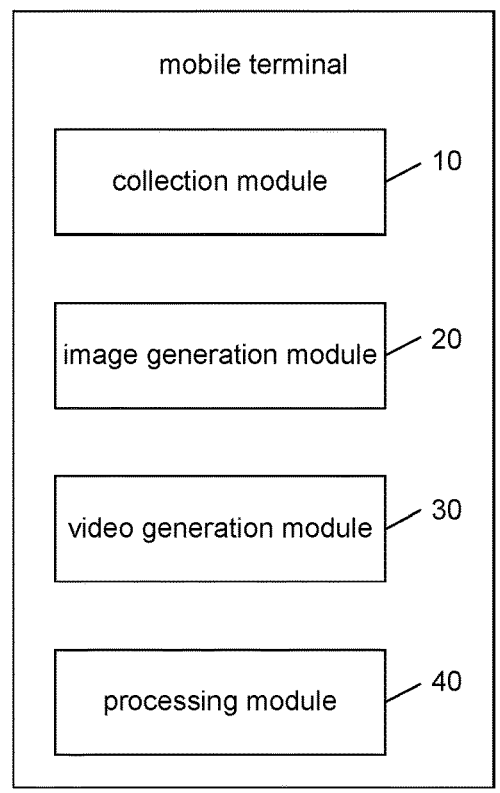
FIG. 4 is a functional module diagram of a second mobile terminal according to an embodiment of the disclosure.

FIG. 4 is a functional module diagram of a second embodiment for a mobile terminal according to the disclosure.

Based on the first mobile terminal according to an embodiment of the disclosure, the mobile terminal may further include:

a processing module 40, configured to perform special effect processing on the captured composite images.

Furthermore, in order to make the user more interested in shooting, before the captured composite images are encoded, the processing module 40 may further perform special effect processing on the captured composite images, the special effect processing including basic effect processing, filter effect processing and/or special scenario effect processing, wherein the basic effect process may includes noise reduction processing, luminance processing, chrominance processing and the like; the filter effect process may include s drawing processing, negative processing, black-white processing and the like; and the special scenario effect processing includes common weather processing, starry sky processing and the like.

Furthermore, in order to enable the user to perform sound recording and video recording in parallel, the step for capturing and encoding the composite images may further include: turning on an audio device to receive audio data; and encoding the audio data. The audio data may be collected by a microphone or may be from a custom audio file. When the audio data is from the custom audio data, an audio file is decoded firstly to obtain original audio data. Preferably, the audio data may be further subject to special effect processing before being encoded, the special effect processing including at least one of special effect recording, sound change, tone change and speed change.

In case of adding an audio recording function, a video file may be generated as follows: in accordance with a video file format set by the user, the video file is generated from encoded image data and encoded audio data in a video file format set by the user.

In order to facilitate operation of the user, an operation interface may be provided for the user to set a mode (interval capturing or continuous capturing) of capturing the composite images, interval time for interval capturing, whether to perform special effect processing, and whether to start an audio recording function.

The preferred embodiments of the disclosure have been described above and are not intended to limit protection scope of the disclosure. Equivalent structure or equivalent flow transformations made by utilizing the description and drawings of the disclosure or direct or indirect applications to other relevant technical fields may fall within the patent protection scope of the disclosure.

In some embodiments according to the disclosure, it shall be understood that the disclosed apparatus and method may be implemented in other modes. For example, the device embodiment described above is only schematic. For example, the division of units is only the division of logical functions, and there may be additional division modes in practice. For example, a plurality of units or assemblies may be combined or integrated to another system, or some features may be omitted or may be non-executed. In addition, displayed or discussed mutual coupling or direct coupling or communication connection between all components may be performed via some interfaces, and indirect coupling or communication connection between devices or units may be in an electrical form, a mechanical form or other forms.

The units illustrated as separate components may be or may not be physically separated. Components for unit display may be or may not be physical units. That is, the components may be located at a place or may be distributed on a plurality of network units.

The aims of the solutions of this embodiment may be achieved by selecting some or all units according to actual requirements.

In addition, all function units in all embodiments of the disclosure may be integrated in a processing module, or each unit may serve as a unit separately, or two or more units may be integrated in a unit. The integrated unit may be implemented in a form of hardware or may be implemented in a form of hardware and a software function unit.

Those skilled in the art may understand that all or some of the steps in the above method embodiment may be implemented by means of hardware relevant to program instructions, the programs may be stored in a computer readable storage medium, and when the programs are executed, the steps in the above method embodiment are executed.

The storage medium includes: various media capable of storing program codes such as a mobile storage device, a Read-Only Memory (ROM), a Random Access Memory (RAM), a magnetic disk or an optical disk.

An embodiment of the disclosure also provides a computer storage medium. A computer executable instruction is stored in the computer storage medium. The computer executable instruction is configured to execute at least one of the methods for shooting a light-painting video, as shown in FIG. 1 and/or FIG. 2.

The computer storage medium may be various types of storage media such as an ROM/RAM, a magnetic disk, an optical disk, a Digital Versatile Disk (DVD) or a U disk. The computer storage medium in this embodiment may be optionally a non-instantaneous storage medium.

It is to be noted that in the apparatus for shooting a light-painting video in the embodiment of the disclosure, the image collection module, the image composition module and the video generation module may correspond to various structures capable of executing the above functions such as various types of processors having an information processing function. Each processor may include information processing structures or chips such as an Application Processor (AP), a Central Processing Unit (CPU), a Digital Signal Processor (DSP) or a Field Programmable Gate Array (FPGA). The processors may achieve the above functions by executing appointed codes.

Figure 5:
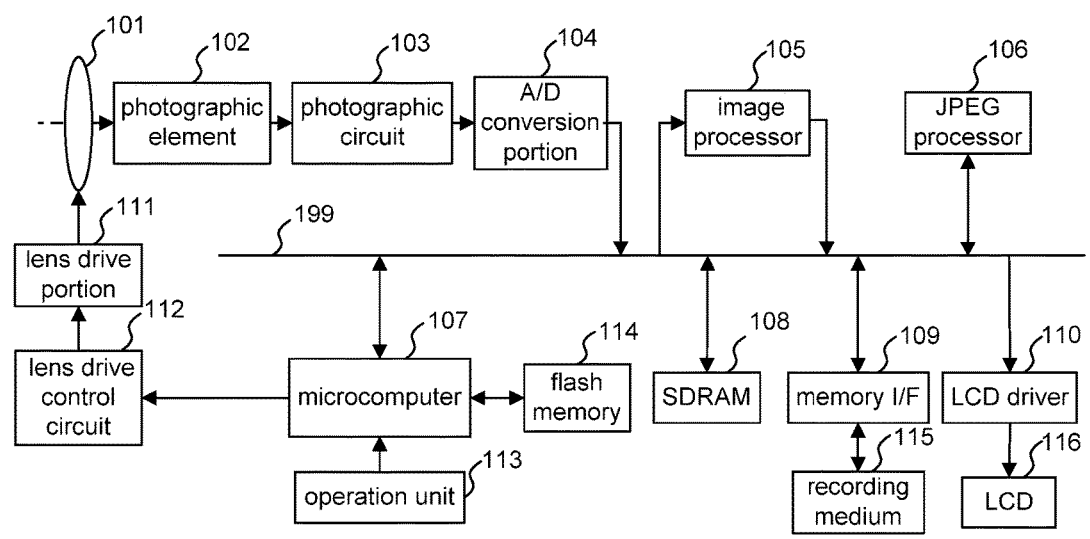
FIG. 5 is an electrical structure diagram of an apparatus for shooting a light-painting video according to an embodiment of the disclosure.

FIG. 5 is a block diagram showing a main electrical structure of a camera according to one embodiment of the disclosure. A photographic lens 101 is composed of a plurality of optical lenses for forming an image of a to-be-photographed object, and may be a single focus lens or a zoom lens. The photographic lens 101 can move along an optical axis direction by means of a lens drive portion 111, a focus position of the photographic lens 101 is controlled according to a control signal from a lens drive control portion 112, and a focus distance is controlled under the condition of the zoom lens. The lens drive control portion 112 performs drive control on the lens drive portion 111 according to a control command from a microcomputer 107.

A photographic element 102 is configured near a position, where the photographic lens 101 forms the to-be-photographed object, on an optical axis of the photographic lens 101. The photographic element 102 functions as a photographic portion for photographing the object and obtaining photographic image data. Two-dimensional (2D) matrix of photoelectric diodes is provided on the photographic element 102, and each of the photoelectric diodes corresponds to one pixel. Each photoelectric diode generates a photoelectric conversion current corresponding to a light interception quantity, and a capacitor connected to the photoelectric diode may accumulate charge from the photoelectric conversion current. A front surface of each pixel is configured with RGB colour filters in the Bayer arrangement.

The photographic element 102 is connected to a photographic circuit 103. The photographic circuit 103 performs charge accumulation control and image signal read-out control in the photographic element 102, performs reset noise reduction, wave shaping and gain boost for a read-out image signal (analogue image signal) so as to form an appropriate signal level.

The photographic circuit 103 is connected to an Analogue-to-Digital (A/D) conversion portion 104. The A/D conversion portion 104 performs A/D conversion on the analogue image signal, and outputs a digital image signal (hereinafter referred to as image data) to a bus 199.

The bus 199 is a transmission path for transmitting various data read out or generated inside the camera. In addition to the A/D conversion portion 104, the bus 199 is also connected to an image processor 105, a Joint Photographic Experts Group (JPEG) processor 106, a microcomputer 107, a Synchronous Dynamic Random Access Memory (SDRAM) 108, a memory interface (hereinafter referred to as memory I/F) 109 and a Liquid Crystal Display (LCD) driver 110.

The image processor 105 performs various types of image processing such as OB subtraction processing, white balance adjustment, colour matrix operation, gamma conversion, colour difference signal processing, noise removal processing, synchronization processing and edge processing on the image data output by the photographic element 102.

The JPEG processor 106 compresses the image data read out from the SDRAM 108 according to a JPEG compression mode, when recording the image data into a recording medium 115. Furthermore, the JPEG processor 106 decompresses JPEG image data in order to reproduce image to be displayed. When the decompression is being performed, a file recorded in the recording medium 115 is being read out. After the decompression at the JPEG processor 106, the decompressed image data is temporarily stored in the SDRAM 108 and is displayed on the LCD 116. The image compression/decompression mode is the JPEG mode in this embodiment, but is not limited thereto. Certainly, other compression/decompression modes such as an MPEG, a Tagged Image File Format (TIFF) and H.264 may be adopted.

An operation unit 113 includes, but is not limited to, physical keys or virtual keys. The physical or virtual keys may be operation members such as various input buttons and various input keys including a power button, a photographic key, an edit key, a dynamic image button, a reproduction button, a menu button, a cross key, an OK button, a deletion button and an amplification button, and operation states of these operation members are detected.

A detection result is output to the microcomputer 107. In addition, a touch panel is disposed on a front surface of the LCD 116 serving as a display portion, to detect a touch position of the user, and output the touch position to the microcomputer 107. The microcomputer 107 executes various processing sequences corresponding to the operation of the user according to a detection result from the operation members of the operation unit 113. Alternatively, the microcomputer 107 may execute various processing sequences corresponding to the operation of the user according to the detection result of the touch panel on the front surface of the LCD 116.

A flash memory 114 stores a program for executing various processing sequences of the microcomputer 107. The microcomputer 107 performs integral control of the camera according to the program. In additional, the flash memory 114 stores various adjustment values of the camera, and the microcomputer 107 reads out the adjustment values and controls the camera according to the adjustment values. The SDRAM 108 is an electrically-alterable volatile memory for temporarily storing image data and the like. The SDRAM 108 temporarily stores image data output from the A/D conversion portion 104 and image data processed in the image processor 105, the JPEG processor 106 and the like.

The microcomputer 107 functions as a control portion for the whole camera, and controls various processing sequences of the camera in a centralized manner. The microcomputer 107 is connected to the operation unit 113 and the flash memory 114.

The microcomputer 107 may control the apparatus in this embodiment by means of an execution program to execute the following operations:

collecting, after shooting begins, an image at a preset time interval by means of a camera;

compositing a current image and a previous image to generate a composite image;

capturing the composite image, and encoding the captured composite image; and generating a video file from data of the encoded composite image, when shooting is ended.

Optionally, compositing the current image and the previous image may include:

compositing the images based on luminance information of the current image and the previous image.

Optionally, compositing the images based on the luminance information of the current image and the previous image may include: judging whether the luminance of a pixel in the current image is greater than that of a pixel in the previous image at the same position; and if yes, replacing the pixel in the previous image at the same position with the pixel in the current image, and compositing the images accordingly.

Optionally, the camera may be a front camera, and after an image is collected at the preset time interval by means of the camera, the operation may further include: mirroring the images.

Optionally, before the captured composite image is encoded, the operation may further include: performing special effect processing on the captured composite image, the special effect processing including at least one of basic effect processing, filter effect processing and special scenario effect processing.

The memory I/F 109 is connected to the recording medium 115, so as to control writing of image data and data such as a file header added to the image data into the recording medium 115 and reading of the data from the recording medium 115. The recording medium 115 may be, for example, a recording medium such as a memory card removably mounted on a camera body. However, the recording medium 115 is not limited thereto, and may be a hard disk and the like built in the camera body.

The LCD driver 110 is connected to the LCD 116. The image data processed by the image processor 105 is stored in the SDRAM. When displaying is needed, the image data stored by the SDRAM is read and displayed on the LCD 116. Or, image data compressed by the JPEG processor 106 is stored in the SDRAM. When displaying is needed, the JPEG processor 106 reads the image data compressed by the SDRAM, decompresses the image data, and displays the decompressed image data by the LCD 116.

The LCD 116 may be provided on a back surface of the camera body to display an image. The LCD 116 is provided with a touch panel for detecting a touch operation of the user. In addition, the display portion is a liquid crystal display panel (LCD 116), but is not limited thereto and may be various display panels such as an organic EL.

The preferred embodiments of the disclosure have been described and are not intended to limit the protection scope of the disclosure. Those skilled in the art may easily envisage variations or replacements within the disclosed technical scope of the disclosure, which may fall within the protection scope of the disclosure. Therefore, the protection scope of the disclosure resides in the appended claims.

What is claimed is:

1. A light-painting image processing method, comprising:
continuously collecting, after shooting begins, light-painting images by means of a camera;
acquiring the light-painting images at intervals, and generating a composite image from a current light-painting image and a previously collected light-painting image during shooting; and
capturing composite images, video-encoding the captured composite images, and generating a light-painting video from the video-encoded composite images after the shooting is ended,
wherein generation of the composite images and capturing of the composite images for video-encoding are two threads that are performed in parallel to avoid storage of the generated composite images.

2. The light-painting image processing method according to claim 1, wherein generating the composite image from the current light-painting image and the previously collected light-painting image during shooting comprises:
selecting a pixel satisfying a preset condition from the current light-painting image and the previously collected light-painting image respectively, and adding the pixels at a same position, so as to generate a composite image.

3. The light-painting image processing method according to claim 2, wherein selecting the pixel satisfying the preset condition comprises:
judging whether a luminance parameter value of the pixel is greater than a preset threshold, and if yes, determining that the pixel satisfies the preset condition, and selecting the pixel.

4. The light-painting image processing method according to claim 2, wherein selecting the pixel satisfying the preset condition comprises:
   judging whether the pixel is a suddenly changed pixel;
   if the pixel is the suddenly changed pixel, calculating an average of luminance parameter values of a preset number of pixels around the suddenly changed pixel, judging whether the average is greater than a preset threshold, and if yes, determining that the suddenly changed pixel satisfies the preset condition, and selecting the suddenly changed pixel; and
   if the pixel is not a suddenly changed pixel, further judging whether the luminance parameter value of the pixel is greater than the preset threshold, and if yes, determining that the pixel satisfies the preset condition, and selecting the pixel.

5. The light-painting image processing method according to claim 1, wherein before video-encoding the captured composite images, the light-painting image processing method further comprises:
   performing special effect processing on the captured composite images.

6. The light-painting image processing method according to claim 1, wherein capturing composite images comprises:
   capturing the composite images continuously or at intervals.

7. The light-painting image processing method according to claim 6, wherein capturing the composite images at intervals comprises:
   capturing the composite images in an automatic interval mode,
   wherein in the automatic interval mode, composite images are captured at a preset time interval, that is longer than a time interval for collecting an image by the camera.

8. The light-painting image processing method according to claim 6, wherein capturing the composite images at intervals comprises:
   capturing the composite images in an automatic interval mode,
   wherein one composite image is captured whenever the camera has collected a preset number of images.

9. A mobile terminal, comprising:
   a collection module, configured to continuously collect light-painting images by means of a camera after shooting begins;
   an image generation module, configured to acquire the light-painting images at intervals, and generate a composite image from a current light-painting image and a previously collected light-painting image during shooting; and
   a video generation module, configured to capture the composite images, video-encode the captured composite images, and generate a light-painting video from the video-encoded composite images after the shooting is ended,
   wherein generation of the composite images and capturing of the composite images for video-encoding are two threads that are performed in parallel to avoid storage of the generated composite images.

10. The mobile terminal according to claim 9, wherein the image generation module is configured to select a pixel satisfying a preset condition from the current light-painting image and the previously collected light-painting image respectively, and add the pixels at a same position, so as to generate a composite image.

11. The mobile terminal according to claim 10, wherein the image generation module is configured to judge whether a luminance parameter value of the pixel is greater than a preset threshold, and if yes, determine that the pixel satisfies the preset condition, and select the pixel.

12. The mobile terminal according to claim 10, wherein the image generation module is configured to: judge whether the pixel is a suddenly changed pixel; if the pixel is a suddenly changed pixel, calculate an average of luminance parameter values of a preset number of pixels around the suddenly changed pixel, judge whether the average is greater than the preset threshold, if yes, determine that the suddenly changed pixel satisfies the preset condition, and select the suddenly changed pixel; and if the pixel is not a suddenly changed pixel, further judge whether the luminance parameter value of the pixel is greater than the preset threshold, and if yes, determine that the pixel satisfies the preset condition, and select the pixel.

13. A non-transitory computer storage medium, a computer executable instruction being stored in the computer storage medium, wherein the computer executable instruction is configured to execute a light-painting image processing method, the method comprising:
   continuously collecting, after shooting begins, light-painting images by means of a camera;
   acquiring the light-painting images at intervals, and generating a composite image from a current light-painting image and a previously collected light-painting image during shooting; and
   capturing composite images, video-encoding the captured composite images, and generating a light-painting video from the video-encoded composite images after the shooting is ended,
   wherein generation of the composite images and capturing of the composite images for video-encoding are two threads that are performed in parallel to avoid storage of the generated composite images.

14. The non-transitory computer storage medium according to claim 13, wherein generating the composite image from the current light-painting image and the previously collected light-painting image comprises:
   selecting a pixel satisfying a preset condition from the current light-painting image and the previously collected light-painting image respectively, and adding the pixels at a same position, so as to generate a composite image.

15. The non-transitory computer storage medium according to claim 14, wherein selecting the pixel satisfying the preset condition comprises:
   judging whether a luminance parameter value of the pixel is greater than a preset threshold, and if yes, determining that the pixel satisfies the preset condition, and selecting the pixel.

16. The non-transitory computer storage medium according to claim 14, wherein selecting the pixel satisfying the preset condition comprises:
   judging whether the pixel is a suddenly changed pixel;
   if the pixel is the suddenly changed pixel, calculating an average of luminance parameter values of a preset number of pixels around the suddenly changed pixel, judging whether the average is greater than a preset threshold, and if yes, determining that the suddenly changed pixel satisfies the preset condition, and selecting the suddenly changed pixel; and
   if the pixel is not a suddenly changed pixel, further judging whether the luminance parameter value of the pixel is greater than the preset threshold, and if yes, determining that the pixel satisfies the preset condition, and selecting the pixel.

17. The non-transitory computer storage medium according to claim 13, wherein before video-encoding the captured composite images, the light-painting image processing method further comprises:

performing special effect processing on the captured composite images.

18. The non-transitory computer storage medium according to claim 13, wherein capturing composite images comprises:

capturing the composite images continuously or at intervals.

19. The non-transitory computer storage medium according to claim 18, wherein capturing the composite images at intervals comprises:

capturing the composite images in an automatic interval mode, wherein in the automatic interval mode, composite images are captured at a preset time interval, that is longer than a time interval for collecting an image by the camera.

20. The non-transitory computer storage medium according to claim 18, wherein capturing the composite images at intervals comprises:

capturing the composite images in an automatic interval mode, wherein one composite image is captured whenever the camera has collected a preset number of images.

* * * * *